June 15, 1948.  L. SCHWITZER ET AL  2,443,480
POWER DRIVEN VEHICLE
Filed Dec. 11, 1943  4 Sheets-Sheet 1
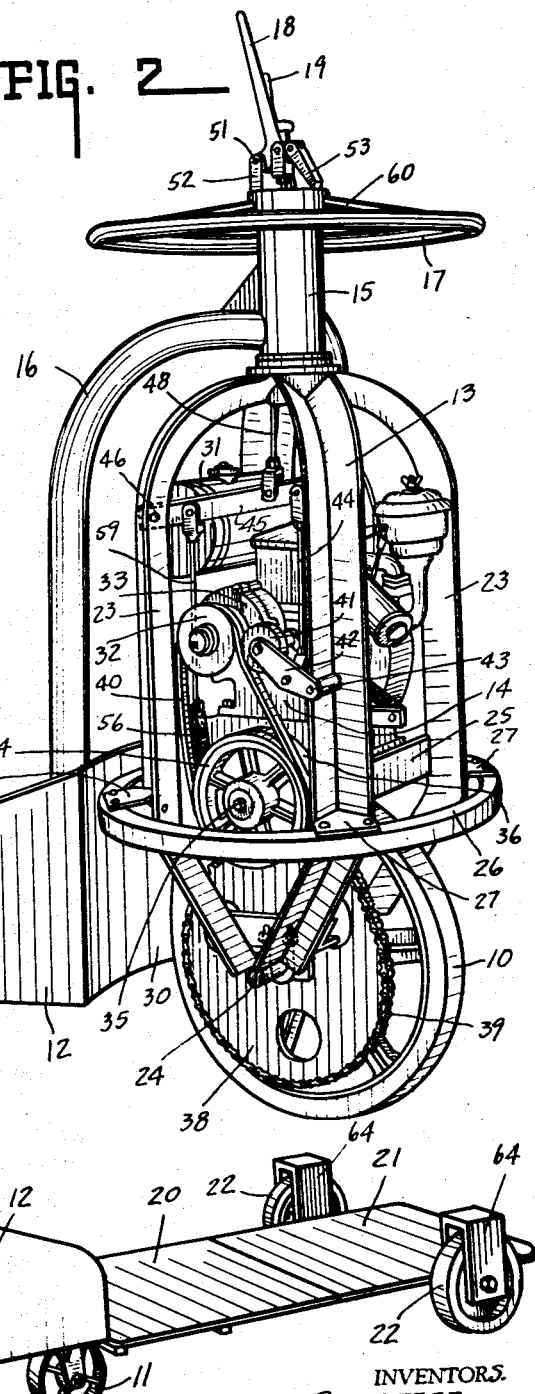
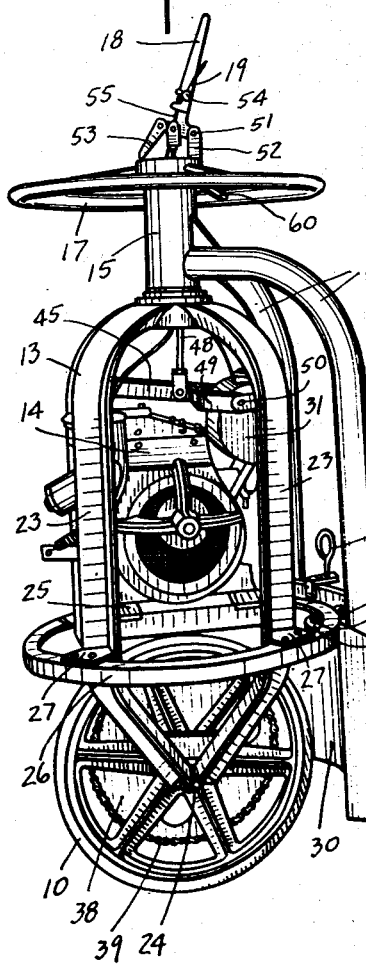
INVENTORS.
LOUIS SCHWITZER.
JOHN ROLAND.
BY Lockwood, Goldsmith & Galt,
ATTORNEYS.

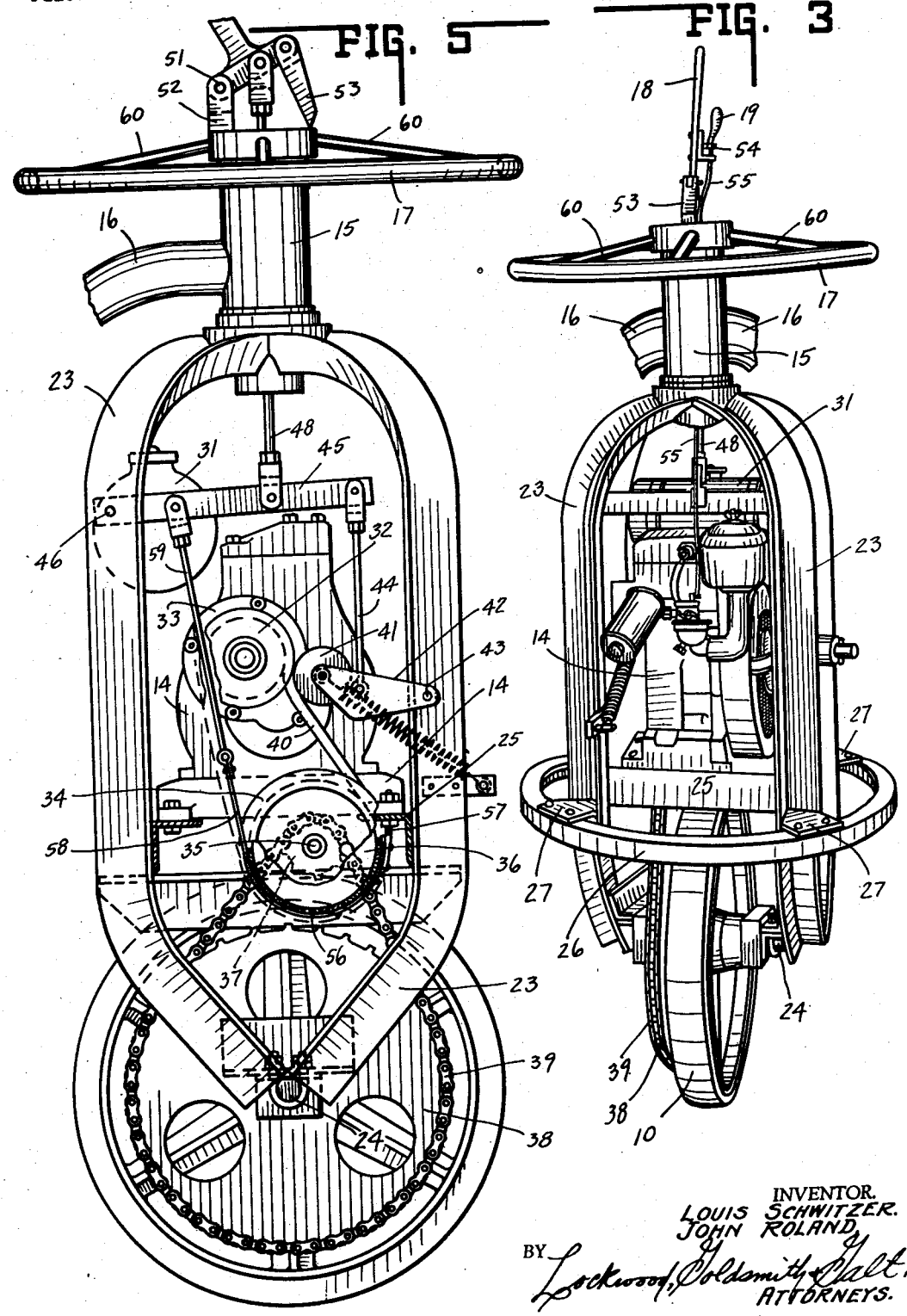

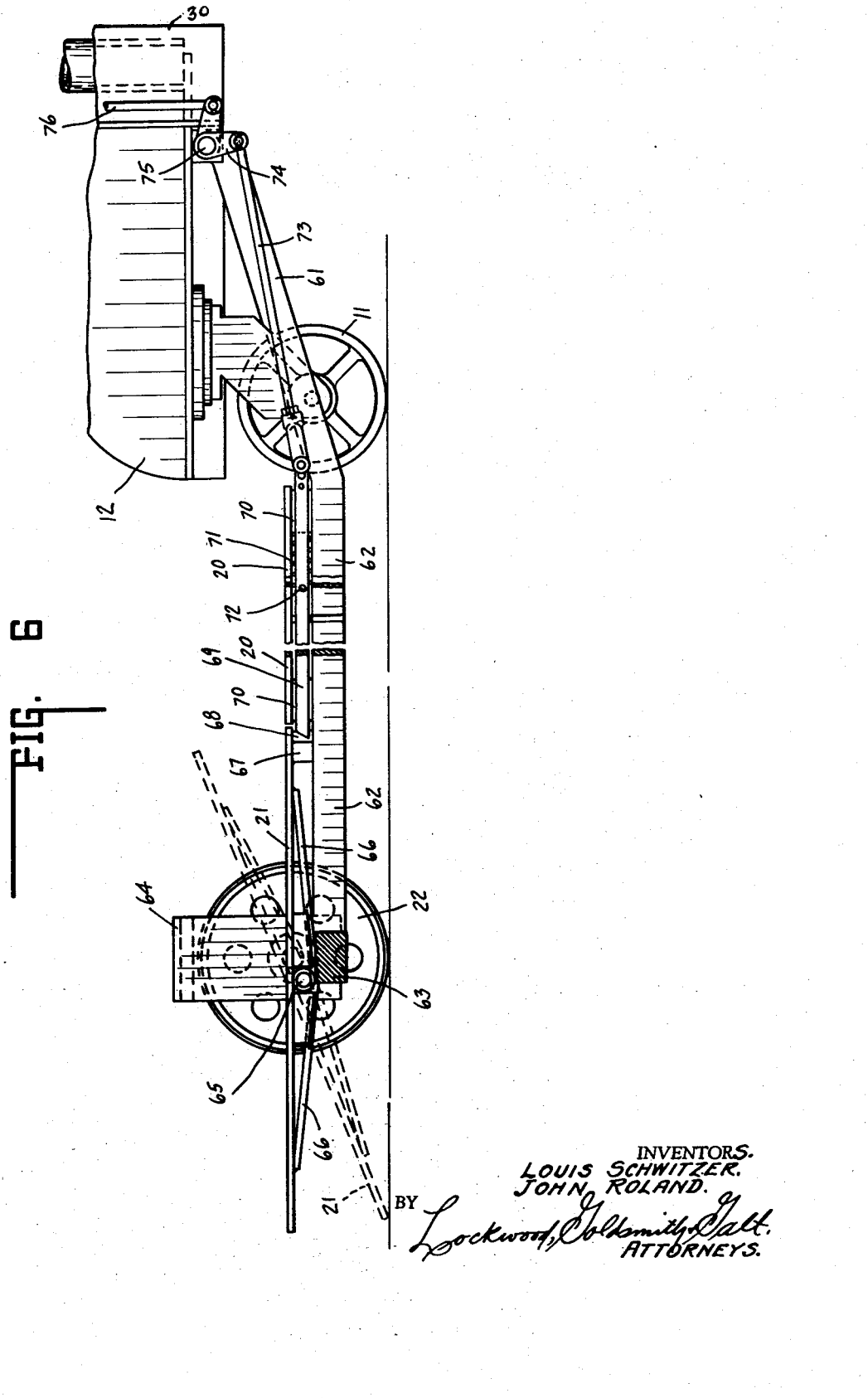

Patented June 15, 1948

2,443,480

UNITED STATES PATENT OFFICE 2,443,480

POWER-DRIVEN VEHICLE

Louis Schwitzer and John Roland, Indianapolis, Ind., assignors to Schwitzer-Cummins Company, Indianapolis, Ind., a corporation Application December 11, 1943, Serial No. 513,858

4 Claims. (Cl. 180—26)

This invention relates to a power driven vehicle such as an industrial truck for shop use in handling and transporting materials, packages, baggage, or the like particularly in confined quarters, but which can be used to advantage wherever material is to be transported.

The object of this invention is to provide a truck which is inexpensive, economical in operation, and easy to handle in confined quarters. For this purpose there is provided a three-wheeled power unit to which a loading and carrying trailer platform is removably connected. The power unit comprises essentially a single front driving wheel which is reversible for driving the truck in any direction depending upon the position in which the front driving wheel is turned. This permits the truck to be "snaked" through and around narrow aisles, sharp corners, and into and out of dead end spaces, its travel being reversed from forward to backward or to a side direction by the mere turning of the driving wheel and without requiring reverse gearing or the like.

One feature of the invention resides in the rotatable frame or cage for supporting and protecting the driving motor and driving mechanism or source of power which is mounted upon the driving wheel to be supported thereby free to revolve in any direction. One advantage of this feature resides in the simplified structure which gives free access to the driving motor while protecting it and guarding it against collision with obstructions irrespective of the driving position. By means of this frame and a circular guard ring, not only is a stabilizing thrust bearing provided, but it will permit the unit to glance off of obstructions including the opening of swinging doors and the like. In addition, it provides a rigid support for the driving unit while permitting the driving parts and motor to be readily removed and replaced with a minimum of disassembly.

Another feature of the invention resides in the power transmission in cooperating association and combination with a friction brake, both the belt drive of the power transmission and the friction brake being operated through a single control lever or handle. This permits manipulation by single lever such as to simultaneously release the power drive and set the brake when in one position; release the brake and permit of a variable speed drive through slippage of the pulleys relative to the belt when moved to an intermediate position; and apply full speed drive when moved to extreme position. By means of this arrangement the control lever may be so arranged as to be moved to driving position in the direction in which it is desired that the vehicle be driven irrespective of whether or not the driving direction is forward, sideways or to the rear.

Futher features of the invention reside in the trailer control operable from the driving unit for breaking and tilting a section thereof from platform transporting position to inclined floor engaging ramp position; and a reversible steering wheel arranged for mounting in a lower or higher position relative to the operator's platform.

The full nature of the invention will be understood from the accompanying drawings and the following description and claims:

Fig. 1 is a view showing the side of the truck in perspective.

Fig. 2 is a perspective view of the power unit.

Fig. 3 is a view showing the front of the power unit in perspective.

Fig. 5 is a central vertical section through the power unit with parts in elevation and portions broken away.

Fig. 6 is a side elevation of the trailer showing a section thereof in loading position by dotted lines.

Figure 4:
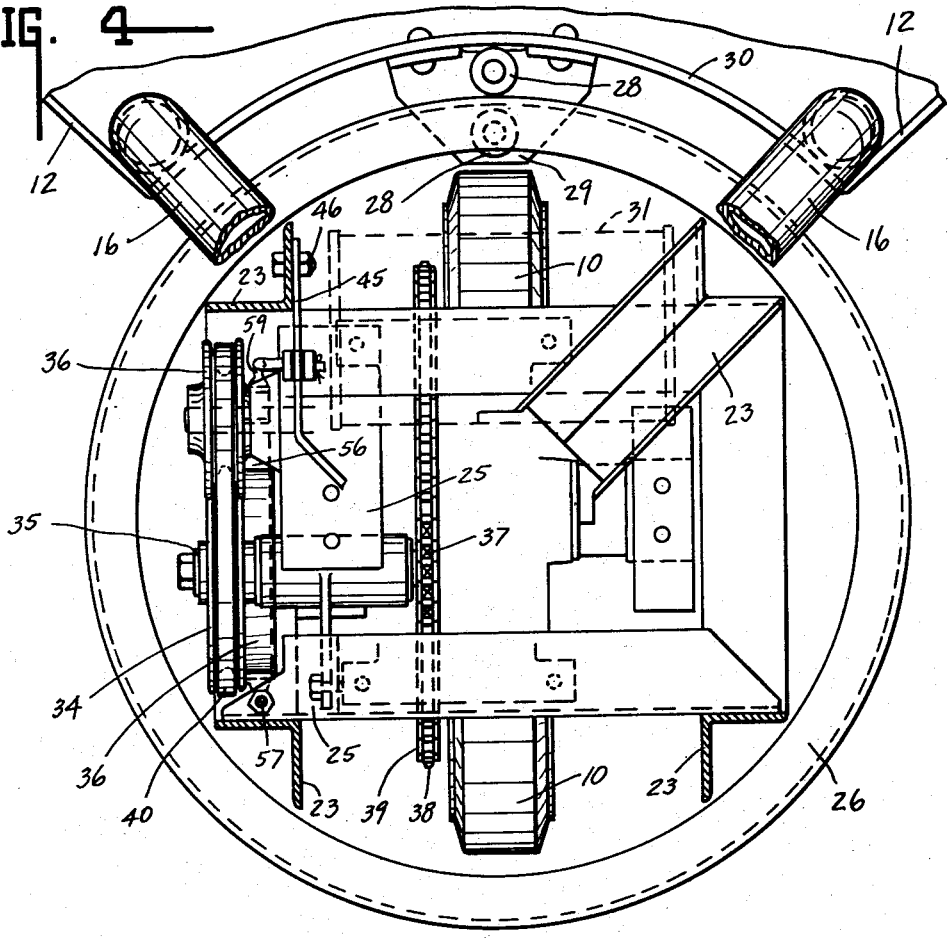
Fig. 4 is a transverse section of the power unit through the motor platform, with parts in section and portions broken away.
Figure 7:
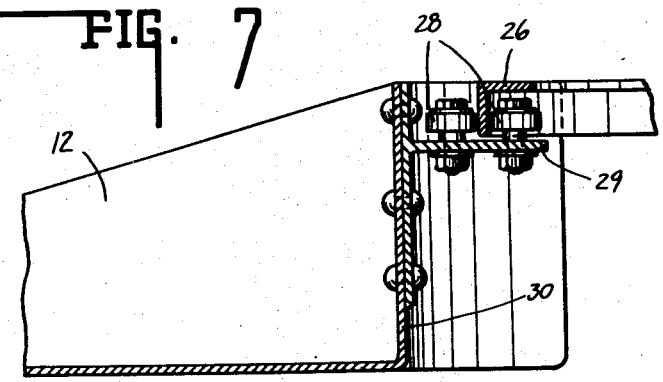
Fig. 7 is a vertical central section through the truck driving platform.

The industrial truck shown in the drawings includes a driving unit comprising a single front driving or traction wheel 10 and a pair of swivel caster wheels 11, a driver's platform having side shields 12 and a power unit frame 13 mounted upon the driving wheel to embrace the driving motor 14. Said frame is mounted to swivel within the upper vertical frame bearing 15 through which it supports the forward platform frame members 16. For steering and reversing the driving unit, a steering wheel 17 is mounted above the bearing 15 in convenient position for an operator standing upon the driving platform. Directly above the steering wheel in convenient position for the operator there is provided an upstanding belt drive and brake control lever in the form of a handle 18 with which the throttle lever 19 is associated. Extending rearwardly from the driving platform and removably connected thereto so as to be supported thereon at its forward end, there is a load carrying trailer 20 having a fulcrumed ramp section 21, said trailer being underslung on the follower wheels 22.

The supporting and protective frame for the motor comprises four equally spaced outwardly bulging angle bars 23 having their upper ends inwardly turned and secured to a spindle extending through the top bearing 15 carrying the forward frame members 16 of the driving platform. At their lower ends, said angle bars are bent inwardly on opposite side of the driving wheel 10 to form a bearing support for the axle 24 thereof. Said angle bars are so arranged and spaced as to completely embrace the motor 14 and offer protection therefor as well as a support while permitting ready access to the operating mechanism. The motor is supported upon a platform 25 secured to said angle bars immediately above the driving wheel, and around said bars slightly below the motor supporting platform there is a protecting and stabilizing ring 26. Said ring is mounted to extend outwardly from said bars and be secured thereto by the flange plates 27.

For providing a stabilizing support for the lower end of the frame, the ring 26 is formed with a downward extending flange arranged to travel between a pair of horizontally mounted stabilizing rollers 28, each pivotally supported upon a bracket 29 secured to a curved forward apron 30 on the operator's platform. By means of this arrangement, the supporting and protective frame 13 is permitted to be turned about while stabilized by the upper bearing 15 and the lower bearing rollers 28, the latter taking the strain of the pulling load from the former.

The driving power is derived from the gasoline motor 14 of any well-known type, preferably of one cylinder which is gasoline fed from the tank 31 carried therewith in the frame. The motor drives the pulley 32 through suitable speed reduction gearing within the housing 33. Carried by suitable bearings on the supporting frame 25, there is a driven pulley 34 keyed to the shaft 35 which carries a brake drum 36 and a sprocket wheel 37. Such sprocket drives the sprocket 38 on the wheel 10 through the sprocket chain 39. The reduction gearing, pulleys and sprockets are herein shown in such ratio that the single cylinder motor rated at about 1¾ horsepower will, at 1800 R. P. M., drive the truck at from four to eight miles an hour.

The V belt 40 transmits driving power between the pulleys 32 and 34 when made taut to clutch said pulleys through engagement thereof by the idler 41. Said idler is mounted upon the free end of a drive control arm 42 which is pivotally supported on one of the angle iron frame members by the stud 43. The arm 42 and idler wheel are operated by the belt drive control lever or handle 18. This control is such that when the handle 18 is moved in the direction in which it is desired to travel, it depresses the arm 42 causing the idler to tighten the belt so as to drive pulley 34. When the handle 18 is moved in the reverse direction, it raises the idler to free the belt and allow the pulleys to freely slip relative thereto. In the intermediate positions of the handle 18 the unit may be driven at intermediate speeds through slippage of the pulleys relative to the belt which permits the driver to operate the truck at any desired speed by the feel of the operating handle in addition to the throttle control of the carburetor. In Fig. 5 the belt 40 and idler 41 are shown in free or non-driving position.

For so controlling the drive, arm 42 is pivotally connected to the lower end of the connecting rod 44, the upper end of which is pivoted to the end of the lever 45, which lever is fulcrumed at its opposite end to one of the angle bars 23 as indicated at 46. Lever 45 is operated by the operating rod 48 having its lower end connected to a U-strap 49, one arm of which is secured to lever 45, the other arm being pivotally supported upon one of the frame angle bars at 50. Said U-strap thereby stabilizes the lever 45 and permits operative connection with the operating rod, which is centrally disposed of the frame.

The upper end of the operating rod 48 is pivotally connected to the control handle 18 to one side of its pivotal support at 51 on the bracket 52 extending upwardly from the hub of the steering wheel 17. For safety, said handle may be locked in position to hold the idler 41 in disengaged inoperative position by a gravity actuated latching finger 53 having its free end engageable with a projection on the hub of the steering wheel to prevent its accidental movement to driving position. Also, the throttle lever 19 is pivotally mounted on the control handle at 54, being connected with the throttle control rod 55 extending downwardly through the bearing 15 to the carburetor on the motor.

This assembly of the control handle 18, throttle and latch is rotatable with the steering wheel and is so related to the driving direction of the driving wheel 10 as to always be operable in the direction of travel. Thus, when the steering wheel is turned to go forward, the handle 18 must be pushed forward. When the steering wheel is turned 180 degrees to reverse the travel, the operative position of the handle will be in such reverse direction. Similarly when the movement is to be to one side or the other, the driving movement of the handle will be in such direction. By means of this arrangement the operator is guided in positioning the steering wheel in the direction in which he wishes to operate the truck according to the direction of movement of the control handle.

The control handle not only acts as a direction finder and belt drive control, but also it simultaneously acts as a brake lever. For this purpose the brake band 56 partially surrounds the brake drum 36 and is fixed at one end to the motor supporting platform 25 at 57, from which it extends downwardly around the brake drum and upwardly to a strap 58, being connected to the adjustable connecting rod 59. Said connecting rod in turn is pivotally secured at its upper end to the lever 45 through which it is operated by the handle 18. This arrangement is such that when the handle 18 is moved to its driving position to tighten driving belt 40, such movement simultaneously releases the brake band 56. As the handle is reversed to loosen the driving belt and disconnect the drive by raising the idler 41, the brake band is simultaneously drawn about the brake drum. In this position it may be locked by engagement of the latch 53.

It will be noted that the steering wheel 17 is supported by downwardly sloping spokes of the spider 60 extending radially from the hub. When in such position the steering wheel is conveniently positioned for a short operator, but is capable of being reversed so that the spokes slope upwardly to position the steering wheel at a higher level for a taller operator.

The forward end of the trailer platform 20 is supported by the driving platform at a lower underslung level, by an upwardly sloping tongue 61 hitched to the under structure thereof, said tongue extending from a low level chassis frame 62 which is connected at its rear end to a cross member 63. Said cross member carries on each end thereof an upwardly extending bracket 64 for receiving one of the trailer wheels 22 in which said wheel has its axle bearing. The rear loading section 21 is directly supported upon a swivel mounting 65 intermediate its ends, being reinforced by the struts 66. Th forward end of this section is provided with a downwardly extending cross piece 67 normally resting upon the chassis frame 62. Thus, section 21 may swivel about its mounting 65 so that the rear end may be tilted downwardly to the floor, while in normal load carrying position it is in horizontal alignment with the forward load carrying platform section 20.

The forward end of section 21 centrally and forwardly of the cross beam 67 has a latch head 68 engageable by the latch bar 69 extending longitudinally under the platform section 20 and slidable in suitable bearings 70 secured to the underside thereof. A spring 71 surrounding the latch rod is positioned between one of the bearings 70 and the cross pin 72 so as to normally maintain said rod in latching position. The forward end of said latch rod is adjustably connected with the connecting rod 73 extending under the driver's platform for pivotal connection to the crank arm 74 fulcrumed upon a stud 75 supported thereunder. The free end of the crank arm is pivotally connected to the operating rod 76 which extends upwardly through the driver's platform and is provided with a handle at the upper end thereof for convenient manipulation.

By means of this arrangement the operator by pulling upwardly on the handle 76 may unlatch the rear loading section 21 permitting it to tilt downwardly to the floor as shown in dotted lines in Fig. 6 for convenient loading or unloading of heavy material. Thereafter said platform 21 is swung to its horizontal position wherein it is latched by action of the spring 71.

From the foregoing description it may be noted that the operation of the truck permits of convenient loading of material onto the platforms 20 and 21 through the manipulation of the section 21. After loading or unloading, the driver may turn the steering wheel so that the direction of movement of the handle 19, for simultaneously releasing the brake and tightening driving belt 40, is in the direction in which he wishes to drive the truck, whether forward, rearward, or to one side or the other. The truck may be driven at full speed by moving the handle to its extreme position thereby rendering the driving belt taut and opening wide the throttle, or at intermediate speeds by intermediate positions of the throttle or handle, whereby the driving belt will be sufficiently loose to permit some slippage while exerting some driving friction. When the handle is moved to driving position sufficiently to actuate the power transmission belt into driving or partial driving engagement, the brake band is thereby released. On the other hand, when the handle is moved to its opposite position for releasing the belt from driving engagement, such movement will simultaneously apply the brake band. In this position the handle may be latched to prevent movement of the truck when left by the driver or when on an incline.

By turning the steering wheel to opposite positions, the truck may be driven forward or backward, or turned either in its forward or backward movement in any direction, and thereby be manipulated in small spaces quickly and with a minimum of effort. By reason of the frame structure which embraces the motor, and particularly the protective ring carried thereby, the driving wheel and motor are well protected from collision with obstructions, and in fact the driver is enabled to drive the truck through swinging doors by the impact and sliding engagement of the protective ring. Also, the protective ring serves as a means for stabilizing the driving unit since it provides a second and lower thrust bearing connection with the truck for receiving the driving thrust of the wheel while permitting full rotating movement, the thrust being taken up through the ring and its engaging roller bearings on the forward apron of the truck.

While the invention has been particularly described as applied to an industrial truck, it is evident that it is also applicable to any power driven vehicle irrespective of its purpose or use.

The invention claimed is:

1. A vehicle having a driving and steering unit therefor rotatably mounted on the forward end thereof to swivel in any direction about a vertical axis, said unit including a power driven traction wheel, a motor carried by said unit above said traction wheel, a power transmission between said motor and wheel, a friction brake for said wheel, a steering wheel connected with said unit for rotating it to any selected driving direction about its vertical axis, and a single control lever mounted on said unit for movement with said steering wheel and manually movable in the selected driving direction of said traction wheel to release said brake and render said power transmission effective.

2. A vehicle having a combined driving and steering unit, said unit comprising a power driven traction wheel, a driving motor directly supported upon and movable with said wheel, means for transmitting driving power between said motor and wheel, a steering member manually rotatable to turn said motor and wheel as a unit to drive in a selected direction, and a control lever carried by said steering member operably connected with said power transmitting means movable in the selected driving direction to render said driving power effective to drive said wheel, whereby said vehicle will be driven in the direction of movement of said lever.

3. A vehicle having a combined driving and steering unit, said unit comprising a bird cage form of supporting and protective frame comprising equally spaced outwardly bulging frame members having their upper ends inwardly turned to converge in an upwardly extending spindle, a traction wheel for supporting said frame, a chassis having an upwardly and forwardly extending support terminating in a bearing for said spindle, a steering member on said spindle for rotating said frame and wheel, a circular stabilizing ring secured about the lower portion of said frame and extending outwardly beyond and surrounding said wheel, a driving motor carried within said frame having a driving connection with said wheel, and a pair of radially spaced stabilizing rollers supported on the forward end of said chassis between which rollers said stabilizing ring can rotate and be stabilized thereby while permitting rotation of said frame and wheel to any desired direction relative to the chassis.

4. A vehicle having a combination driving and steering unit, said unit comprising a power driven traction wheel and a superimposed frame structure carried thereby, an internal combustion engine mounted within and protected by said frame, a fuel reservoir mounted in said frame connected with said engine for feeding fuel thereto, a power transmission operable by said internal combustion engine to drive said wheel, a steering swivel post extending upwardly from said frame in perpendicular alignment with the axle of said wheel, a steering member mounted on said post for horizontal rotation whereby said wheel, frame and engine may be rotated as a unit in any desired driving direction about a vertical axis, a brake for said traction wheel, a control lever carried by said steering wheel operably connected with said power transmission and brake to simultaneously release said brake and render said power transmission effective when moved in the driving direction, and a throttle carried by said steering member operably connected with said engine to control the operation thereof.

LOUIS SCHWITZER.
JOHN ROLAND.

REFERENCES CITED

The following references are of record in the file of this patent:

UNITED STATES PATENTS

| Number | Name | Date |
| --- | --- | --- |
| 698,836 | Hight | Apr. 29, 1902 |
| 1,346,914 | Sauvage | July 20, 1920 |
| 1,346,915 | Sauvage | July 20, 1920 |
| 1,450,906 | Anderson | Apr. 10, 1922 |
| 1,663,299 | Grist | Mar. 20, 1928 |
| 1,727,933 | Mitchell | Sept. 10, 1929 |
| 1,814,635 | Schlundt | July 14, 1931 |
| 1,833,844 | Lusse | Nov. 24, 1931 |
| 1,956,766 | Jordan | May 1, 1934 |
| 1,999,188 | Golrick | Apr. 30, 1935 |
| 2,081,256 | Van Berkel | May 25, 1937 |
| 2,173,277 | Jarmin et al. | Sept. 19, 1939 |
| 2,305,762 | Cristofoletti et al. | Dec. 22, 1942 |
| 2,306,042 | Custer | Dec. 22, 1942 |